H. RENOLD.
DRIVING CHAIN OF THE SILENT TYPE.
APPLICATION FILED JUNE 20, 1914.
1,180,539.
Patented Apr. 25, 1916.
2 SHEETS—SHEET 1.
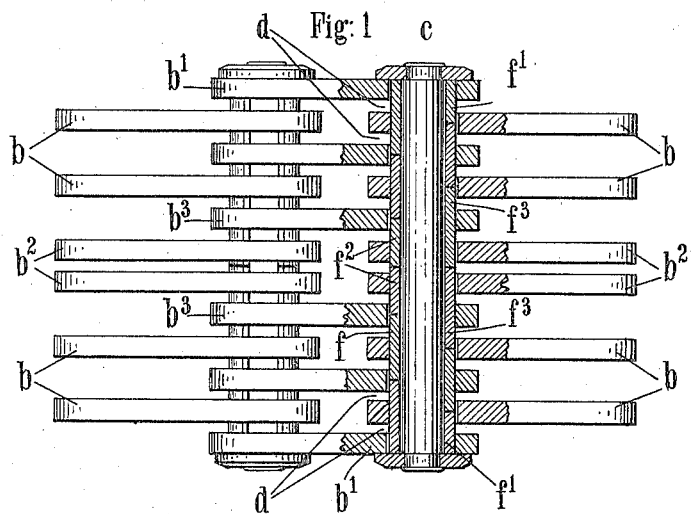
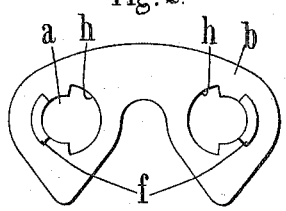
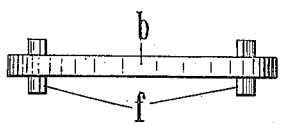
Witnesses
Inventor.
Hans Renold

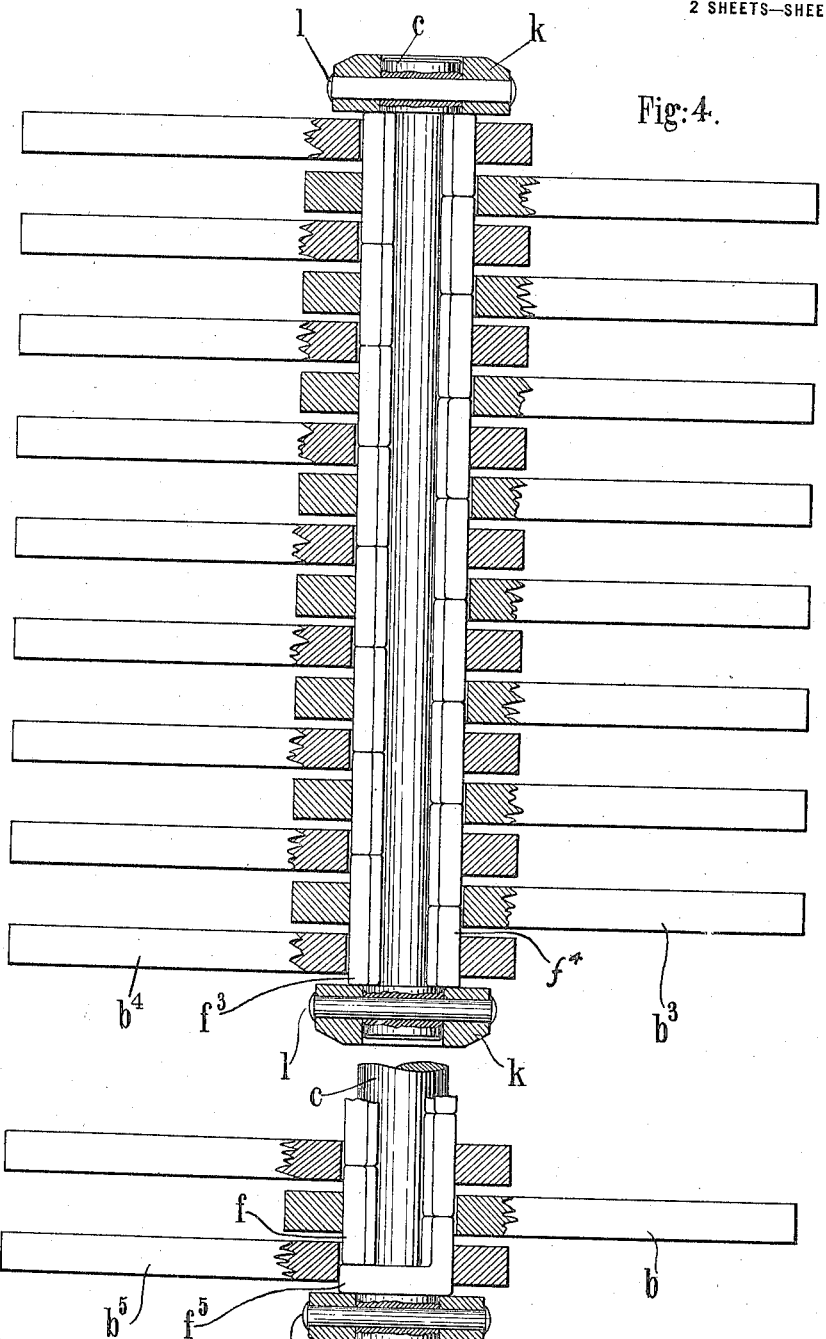

UNITED STATES PATENT OFFICE.

HANS RENOLD, OF MANCHESTER, ENGLAND, ASSIGNOR TO FIRM HANS RENOLD LIMITED, OF MANCHESTER, ENGLAND, A CORPORATION.

DRIVING-CHAIN OF THE SILENT TYPE.

1,180,539.

Specification of Letters Patent.

Patented Apr. 25, 1916.

Application filed June 20, 1914. Serial No. 846,220.

*To all whom it may concern:*

Be it known that I, HANS RENOLD, a subject of the King of Great Britain, of Progress Works, Brook street, Manchester, in the county of Lancaster, England, have invented certain new and useful Improvements in Driving-Chains of the Silent Type, of which the following is a specification.

This invention relates to chains of the silent type, wherein segmental liners are employed engaging in the links and bearing upon the studs, as described for example in the specification of British Patent No. 26805 of 1910. In such chains it has been suggested to insert the segmental liners separately into each link, and to make them long enough to project freely through the openings in the adjacent chain links while passing just sufficiently far through said openings to space the links a very slight distance apart with the object of preventing galling between the link faces.

It is the object of the present invention to improve chains of this type by modifications in the construction thereof designed primarily to facilitate lubrication and so greatly to prolong the life of the chains.

In the chains constructed according to the British patent above referred to, even if the chains are made to dip constantly into oil, it is found that the lubrication may not be sufficient to prevent considerable wear, and the friction may become so great that the liners become ineffective particularly near the ends thereof, in a comparatively short time.

The present invention rests upon the further discovery that if the liners are made still longer than is necessary in order to prevent galling of the links, thus spacing the links farther apart and leaving longer gaps in the free spaces between the overlapping liners exposed between the links, the lubricant when applied by any usual method will readily find its way to the wearing surfaces between the liners and the transverse studs, and efficient lubrication will thus be secured while wearing of the chain and consequent wearing the chain wheels will be largely prevented.

It is a further object of this invention to provide improved means of applying the lubricant to the chain whereby it is distributed precisely at the gaps between the links where it is most required.

The invention will now be described with reference to the drawings illustrating some examples of the construction thereof.

In the drawings, Figure 1 is a plan view of part of a chain, shown partly in section. Fig. 2 is an elevation showing one link thereof. Fig. 3 is a plan view of the link shown in Fig. 2. Fig. 4 shows a plan view of a modified construction. Fig. 5 shows a detail view of a further modification.

The links $b$ are of a form substantially identical in outline with that described in the specification of British Patent 26805 of 1910. They have holes $a$ formed in them at the ends, with recesses at the outer sides thereof to accommodate the segmental liners $f$ which are forced into position. On the inner sides of the holes $a$ the links have additional recesses $h$ in order to accommodate the laterally projecting ends of the liners $f$ of neighboring links. These liners are formed of hard steel while the links $b$ are of tough steel. The end links $b'$ have the liners $f'$ projecting only at one side thereof, while in a chain having pairs of links $b^2$ at the center, in alternate sections of the chain, embracing the same pairs of studs $c$, the liners $f^2$ project considerably more at one side than at the other side of said central links as seen in Fig. 1, and the next succeeding links $b^3$ in the length of the chain, have the liners $f^3$ projecting to a still greater degree in order to extend completely across the interval between the links $b^2$ at the center of the chain, and to space the links $b^3$ properly apart. It will be seen that in the chain as in Fig. 1, there are gaps left at $d$ between the liners $f, f', f^2, f^3$ where they overlap with the stud $c$ between them in the spaces between the links $b, b', b^2, b^3$, and these gaps, and also the spaces between the link faces, are amply sufficient to permit of the ready feed of the lubricant to the bearing surfaces between the studs $c$ and the liners $f, f', f^2, f^3$.

The spaces left between the links $b, b', b^2, b^3$ by means of the extension of the liners, may be from one quarter to one half of the thickness of the links in a chain of the type illustrated. In chains having links which are very thin in proportion to their length the spaces left may be even greater in relation to the breadth of the links. Conversely, in chains having very heavy links, the spaces may sometimes be rather less than a quarter of the width of the links, but the spaces must always be amply sufficient to provide for effective supply of the oil to the bearing faces as hereinbefore specified. In fact when a lubricating oil is used such as is ordinarily employed with driving chains, the adjacent links should be spaced at least one twentieth of an inch apart in a chain of the type illustrated having links five thirty-seconds of an inch in width and the spacing would preferably be greater, particularly for chains having still heavier links. Whether the chains dip into oil, or have the oil applied to them in any other known manner, it will always flow readily into the gaps at $d$, and the lubrication will be very effective.

In Fig. 4 a modified form of chain is shown wherein the links of the type $b$, having liners of the type $f$, are used in all the middle parts of the chain. The chain has unequal numbers of links in the successive combinations. In the one set having the lesser number of links, the end links are of the type $b^3$ having liners of the type $f^3$. In the other set having the greater number of links, the end links are of a new type $b^4$, having liners $f^4$, which differ from the liners $f'$ of Fig. 1, by the fact that they project approximately to the width of gaps $d$ on the outside, so that the washers $k$ on the ends of the studs are spaced away from the webs of links $b^4$, and bear only against the liner projections. The washers $k$ are shown in this case as being secured to stud $c$ by transverse pins $l$.

Fig. 5 shows a slight modification of Fig. 4 wherein the links $b^3$ are replaced by links of the type $b$ with liners $f$, and end links $b^5$ are used on the sets having the larger number of links, the said links $b^5$ having their liners $f^5$ formed with cylindrical portions at the outer sides in order to present a circular bearing surface against the washers $k$.

Having thus described my invention what I claim as new and desire to secure by Letters Patent is:—

1. The combination in a chain, of a plurality of links, studs coupling the links in successive sets in the length of the chain, and segmental liners rigidly secured to the links, said liners bearing upon the studs and projecting through apertures in adjacent links, and projecting farther beyond the link faces to an extent such that the adjacent links in the chain are spaced apart to a distance substantially greater than is necessary to prevent galling between the links, whereby the ready feed of lubricant to the bearing surfaces between the studs and the segmental liners between the adjacent chain links is permitted, substantially as described.

2. The combination in a chain, of links disposed in sets with a plurality of links in each set, studs connecting together the successive link sets in the length of the chain, and segmental liners fixed in the ends of the links and adapted to bear upon the studs, said liners projecting through apertures in adjacent links and projecting farther beyond the faces of the links in such manner as to contact one with another at their ends along the studs and to space the link ends apart laterally of the chain to an extent not less than one twentieth of an inch between their adjacent link faces on each stud.

In witness whereof, I have hereunto signed my name this 21st day of May 1914 in the presence of two subscribing witnesses.

HANS RENOLD. [L. S.]

Witnesses:
WILLIAM H. LEATNEY,
CHARLES C. RENOLD.

Copies of this patent may be obtained for five cents each, by addressing the "Commissioner of Patents, Washington, D. C."